United States Patent [19]

Cohn et al.

[11] Patent Number: 5,782,174
[45] Date of Patent: Jul. 21, 1998

[54] SOFT HOOD AND MODULE DOUGH-PROOFING ASSEMBLY

[76] Inventors: Robert J. Cohn, 61 Sterling Ave., Dallas, Pa. 18612; Chad Morgan, RD 4 Box 524, West Pittston, Pa. 18643; Arnold S. Rifkin, 200 Riverside Dr., Wilkes-Barre, Pa. 18702; John Hutnick, 250 Wilson St., Larksville, Pa. 18704

[21] Appl. No.: 858,117

[22] Filed: May 19, 1997

[51] Int. Cl.$^6$ .............. A47J 39/00; A47J 39/02; A47B 31/02; F25B 29/00
[52] U.S. Cl. .................. 99/476; 99/448; 99/468; 99/483; 165/267; 165/919; 219/386; 219/401; 312/236
[58] Field of Search .............. 99/325–333, 342, 99/352–355, 447, 448, 467–476, 483, 516, 534; 34/196–200; 62/520, 419, 457.1; 126/20, 268, 377; 165/61, 64, 265, 267, 48.1, 918, 919; 219/386, 387, 478, 480, 506, 521, 401; 312/236; 426/233, 506, 418, 523

[56] References Cited

U.S. PATENT DOCUMENTS

| | | | |
|---|---|---|---|
| 4,052,589 | 10/1977 | Wyatt | 34/196 X |
| 4,483,243 | 11/1984 | Cote | 99/476 X |
| 4,587,946 | 5/1986 | Doyon et al. | 219/401 X |
| 4,635,540 | 1/1987 | Dowds | 99/468 |
| 4,648,382 | 3/1987 | Greenbacker | 165/919 |
| 5,069,273 | 12/1991 | O'Hearne | 312/236 X |
| 5,086,693 | 2/1992 | Tippmann et al. | 99/468 X |
| 5,201,364 | 4/1993 | Tipmann et al. | 99/448 X |
| 5,203,258 | 4/1993 | Tippmann et al. | 34/200 X |
| 5,228,385 | 7/1993 | Friedrich et al. | 99/352 |
| 5,273,360 | 12/1993 | Wyatt et al. | 219/386 X |
| 5,404,935 | 4/1995 | Liebermann | 99/470 X |
| 5,520,102 | 5/1996 | Monetti | 99/467 X |

*Primary Examiner*—Timothy F. Simone
*Attorney, Agent, or Firm*—Michael Ebert

[57] ABSTRACT

A soft hood and module assembly adapted to convert an open baker's rack loaded with pieces of yeast dough into a proofing chamber where the pieces are subjected to a hot humid air environment acting to raise these pieces prior to their baking. The module for generating hot humid air is placed in the base of the rack with its air inlet adjacent the front end of the rack and its outlet adjacent the rear end. The soft hood which is fabricated of flexible plastic sheeting encloses the rack to form a chamber having a feed duct parallel to the rear end of the rack which communicates with the module outlet, and a return duct parallel to the front end of the rack which communicates with the module inlet. In operation, hot, humid air blown out of the module outlet into the feed duct is distributed thereby to pass across the dough pieces supported by the rack into the return duct from which the air flows back into the inlet of the module for recirculation in the chamber to uniformly proof the pieces.

15 Claims, 3 Drawing Sheets

SOFT HOOD AND MODULE DOUGH-PROOFING ASSEMBLY

BACKGROUND OF INVENTION

1. Field of Invention

This invention relates generally to proofing chambers for subjecting pieces of yeast dough to a hot, humid air environment so as to raise these pieces preparatory to their being baked, and more particularly to a soft hood and module assembly for converting a baker's rack loaded with the pieces into a proofing chamber.

2. Status of Prior Art

Proofing refers to a process by which pieces of yeast dough shaped to form bakery products are raised or enlarged preparatory to their being baked. Thus pastries, rolls and breads and other bakery products must undergo proofing before being put in an oven to be baked.

When dough intermixed with live yeast is placed in a warm moist environment, carbon dioxide is then internally generated throughout the body of the dough to create myriad gas pockets. These gas pockets enlarge or raise the dough and also alter its texture.

When the proofed dough is baked, the resultant product is lighter and more chewy than dough products which are not raised prior to baking. Thus croissants, donuts, pan pizzas, rolls and breads must be properly proofed before being baked. Proofing therefore is the process by which the shaped yeast dough pieces are subjected to a moist, hot air environment to raise the pieces, and a proofing cabinet is a chamber in which proofing takes place. Heretofore such cabinets have been fabricated of rigid materials and therefore constitute "hard" cabinets as distinguished from a "soft" hood formed of flexible plastic sheeting in accordance with the invention creating a proofing chamber.

It is vital that the environment in which proofing takes place within a cabinet be properly controlled to avoid underproofing or overproofing. Thus should the dough pieces receive excessive heat, they will rise too fast, thereby producing large gas pockets that cause the pieces to collapse during baking. On the other hand, insufficient heat results in dough pieces that are not fully raised, and when these pieces are baked, they will have a doughy core. Excessive moisture in proofing causes the product to have a mushy surface, while insufficient moisture renders the surface of the baked product tough and rubbery.

In order therefore to properly proof a load of yeast dough pieces, all pieces in the proofing chamber must be subjected to optimal conditions of heat and moisture that are uniform throughout the chamber and give rise to uniform raising of the pieces.

Two types of proofing cabinets are now in common use. In large scale bakeries as well as in supermarkets having baking facilities, use is made of a floor-mounted proofing cabinet adapted to accommodate a multi-level baker's rack loaded with sheet pans carrying the dough pieces to be proofed. In this stationary type of proofing cabinet the loaded baker's rack is rolled into the floor mounted proofing cabinet in which the dough pieces loaded on the rack are then subjected to hot, humid air.

For smaller installations, such as in a small scale bakery, a donut shop or a pizzeria, use is made of a mobile proofing cabinet, usually about 6 feet high and 2 by 2 feet square, fabricated of sheet aluminum and provided with Lexan doors. With a mobile proofing cabinet, the dough pieces to be proofed are placed on flat pans which are received on multi-level slides in the cabinet.

But whether proofing is carried out in a stationary cabinet or in a mobile cabinet, the cost of these cabinets is relatively high and the cabinets take up space in the bakery facility that may be in short supply.

Thus all bakeries are equipped with open baker's racks on casters for conveying dough products to various stations in the facility. There may therefore be little room available in the bakeries for a large proofing cabinet, particularly for a cabinet that must be installed at a fixed position.

Of prior art interest is the 1984 patent to Cote U.S. Pat. No. 4,483,243 which discloses a proofing cabinet into which is wheeled a rack loaded with bakery products to be proofed. Coupled to the cabinet by a duct is a heat generator, the heated air being circulated by a fan.

The 1987 patent to Raufeisen U.S. Pat. No. 4,674,402 refers to the above Cote patent, the concern of this patent being with proofing frozen bakery goods which must therefore be thawed before being proofed.

Other proofing cabinet arrangements are shown in the 1939 Frisk U.S. Pat. No. 2,147,024, the 1987 Doods U.S. Pat. No. 4,635,540, and the 1991 Hullstrung U.S. Pat. No. 5,079,666. The concern of Hullstrung is with the distribution of water vapor throughout the cabinet without producing hot and cold spots. Thus a common drawback of commercially available proofing cabinets is that the hot, humid air environment within the cabinet interior is uneven, some regions being warmer and moister than others; as a consequence of which the dough pieces within this environment are not uniformly proofed.

SUMMARY OF INVENTION

In view of the foregoing, the main object of this invention is to provide a soft hood and module assembly adapted to convert an open bakery rack into a proofing chamber for subjecting yeast dough pieces loaded on the rack to a hot, humid air environment acting to raise these pieces preparatory to their being baked.

More specifically, an object of this invention is to provide an assembly of the above type in which the soft hood is formed of flexible plastic sheeting, and the module is a compact unit received in the base of the rack functioning to produce a stream of hot, humid air which flows over the pieces to be proofed.

Among the significant advantages of an assembly in accordance with the invention is the following:

A. The baker's rack which is convertible to a proofing chamber is a standard rack, and may therefore also be used to transport bakery products in the bakery facility.

B. When not in use to create a proofing chamber, the plastic hood may be collapsed and stored in a relatively small space.

C. The hot, humid air generated by the module is recirculated by the hood throughout the rack loaded with the dough pieces to be proofed, and the humid air is so distributed as to uniformly proof these pieces whereby no pieces are overproofed or underproofed.

D. The soft hood can be cleaned without difficulty and rendered sterile in condition for reuse.

E. The hood and module which compose the assembly can be installed on a baker's rack wherever this rack is placed, making it unnecessary to roll the rack into a floor-mounted proofing cabinet.

Briefly stated, these objects are attained by a soft hood and module assembly adapted to convert an open baker's rack loaded with pieces of yeast dough into a proofing chamber in which the pieces are subjected to a hot humid air environment acting to raise these pieces prior to baking.

The module for generating hot humid air is placed in the base of the rack with its air inlet adjacent the front end of the rack and its outlet adjacent the rear end. The soft hood which is fabricated of flexible plastic sheeting encloses the rack to form a chamber having a feed duct parallel to the rear end of the rack, which communicates with the module outlet and a return duct parallel to the front end of the rack which communicates with the module inlet. In operation, hot humid air blown out of the module outlet into the feed duct is distributed thereby to pass across the dough pieces supported by the rack into the return duct from which the air flows back into the inlet of the module for recirculation in the chamber to uniformly proof the pieces.

BRIEF DESCRIPTION OF DRAWING

For a better understanding of the invention, as well as further features thereof, reference is made to the detailed description thereof to be read in connection with the annexed drawings wherein.

DESCRIPTION OF INVENTION
Structure of Assembly

Figure 1:
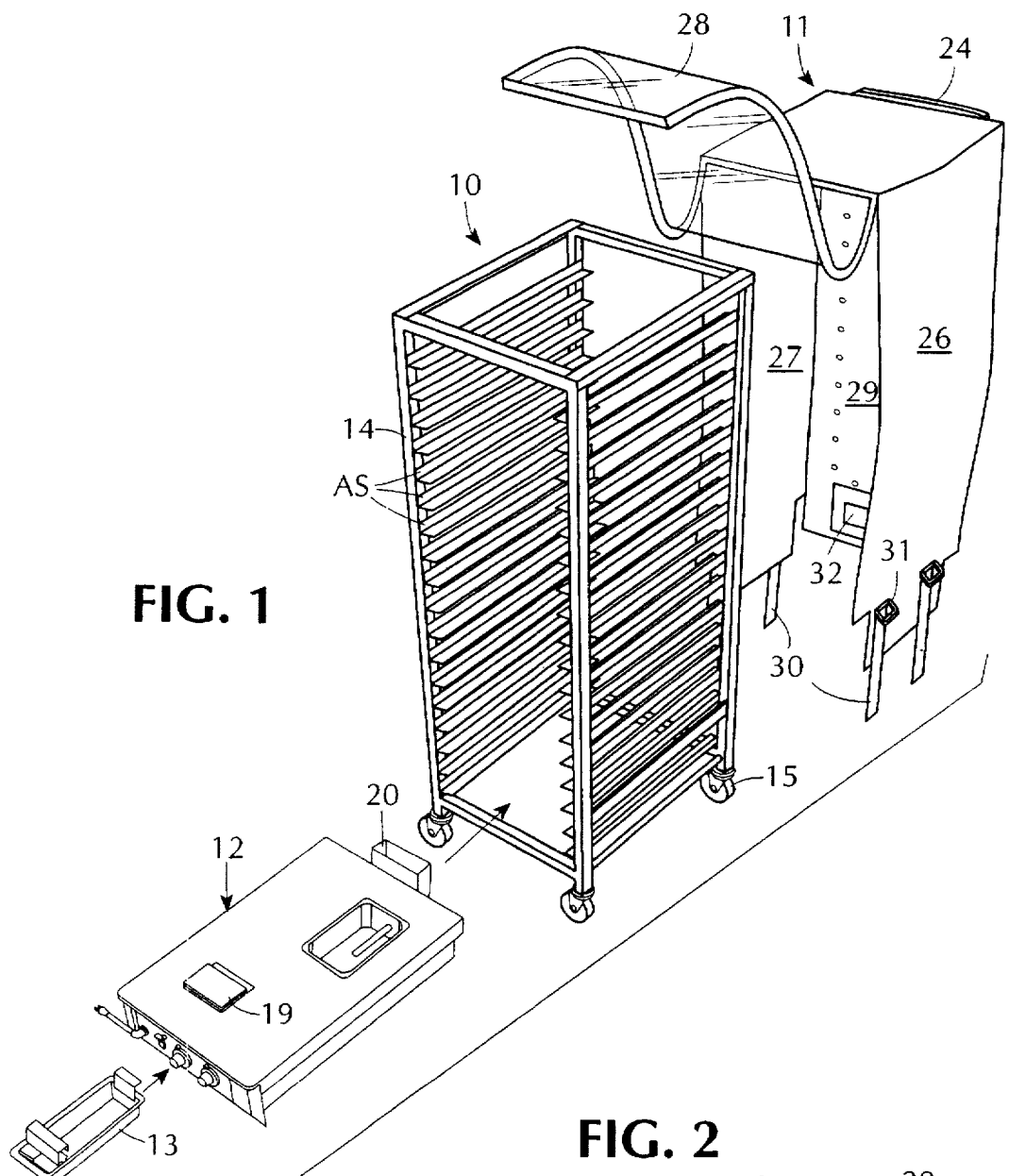
FIG. 1 shows a soft hood and module assembly in accordance with this invention for proofing pieces of yeast dough loaded on a baker's rack, the figure showing the module to be installed in the base of the rack, with the hood in the process of being placed over the rack.
Figure 2:
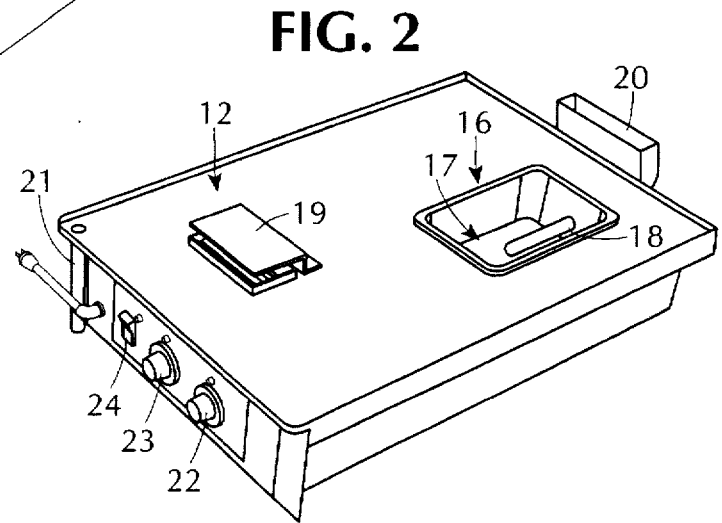
FIG. 2 is a separate view of the module for generating hot, humid air.

Referring now to FIGS. 1 and 2, there is shown an assembly for converting a multi-level baker's rack 10 into a chamber for proofing shaped yeast dough pieces loading the rack. The assembly is composed of a soft hood 11 and a module 12 for generating hot, humid air to be recirculated throughout the proofing chamber defined by the hood. The module is provided with a removable condensed water drip pan 13.

Rack 10 includes a frame 14 formed by vertical and horizontal metal rods welded or riveted together to define a parallelpiped structure having casters 15 attached to the lower ends of the vertical rods so that the rack may be wheeled to any desired site.

Bridging the vertical rods of frame 14 which form the parallel sides of the frame is a vertical array of equispaced metal angle strips AS forming multi-level slides for receiving pans carrying the pieces of yeast dough to be proofed. In practice, rack 10 may be a standard baker's rack or a standard rack modified to better accept the soft hood. Or the baker's rack may be of the folding or nesting type to save storage space.

Module 12 which fit into the base of the frame includes a shallow water pan 16 having a well 17 in which is mounted an electrical heater element 18 for boiling the water to produce steam. Within the module is a motor-driven blower B and electrical heater E (see FIG. 6). Air is drawn into the module by the blower through an inlet 19, while hot, humid air is blown out of the module through an outlet 20. The blower in the module therefore creates a negative pressure at inlet 19 and a positive pressure at outlet 20. As a consequence, air flowing over the heated water pan 16 entrains steam emanating from the pan, the resultant moist air being sucked into inlet 19 and being blown out of outlet 20 as a stream of hot, humid air.

Module 12 is provided with a condensed water drain tube 21 which drains into water drip pan 13, the pan sliding under the module to register with the drain tube. Control knob 22 on the front panel of the module adjusts the humidity of the hot air stream, while control knob 23 adjusts its temperature. Power is controlled by switch 24.

Proofing hood 11 is referred to as a soft hood in that it is fabricated of flexible transparent synthetic plastic sheeting, such as polyethylene or PVC, and the hood is therefore collapsible.

The overall dimensions of proofing hood 11 substantially match those of baker's rack 10 which is hooded thereby. When the hood is in place, it covers the top of the rack as well as both sides thereof and its front and rear ends to create a proofing chamber occupied by the rack.

Hood 11 includes a top wall 25 that rests on top of rack 10 and has substantially the same rectangular dimensions. Depending from top wall 25 of the hood are parallel side panels 26 and 27 overlying the corresponding sides of the rack. Front and rear panels 28 and 29 which depends from top wall 25 of the hood overlie the front and rear ends of the rack.

Figure 4:
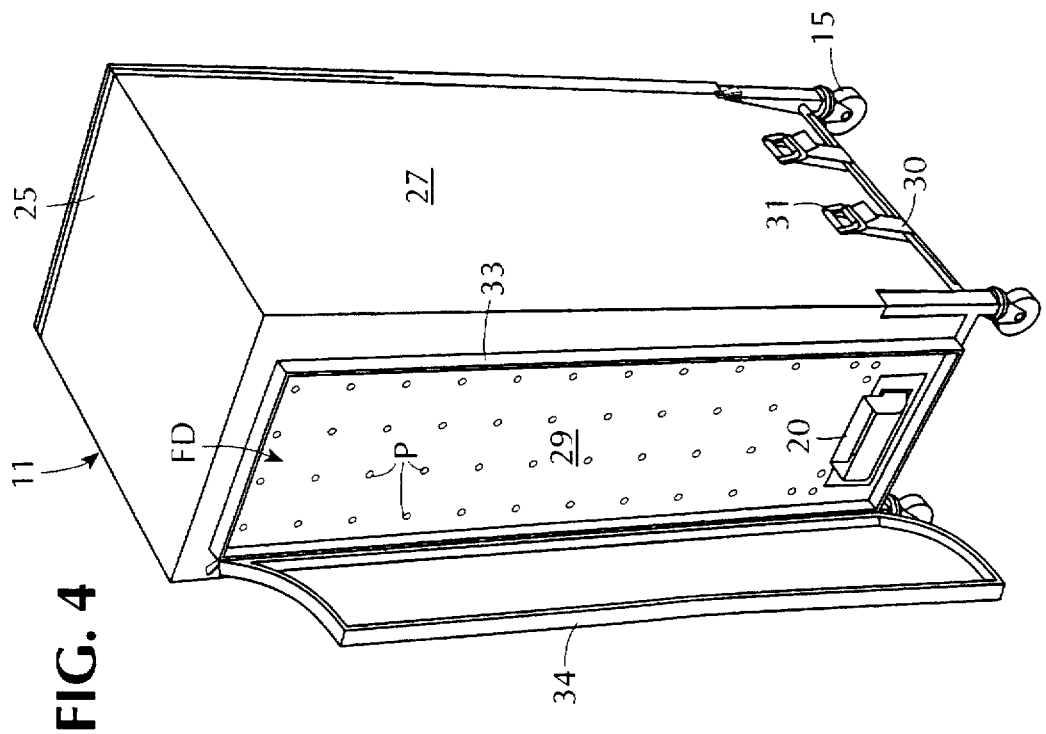
FIG. 4 is a perspective view of the rack covered by the proofing hood as seen from its rear end.
Figure 3:
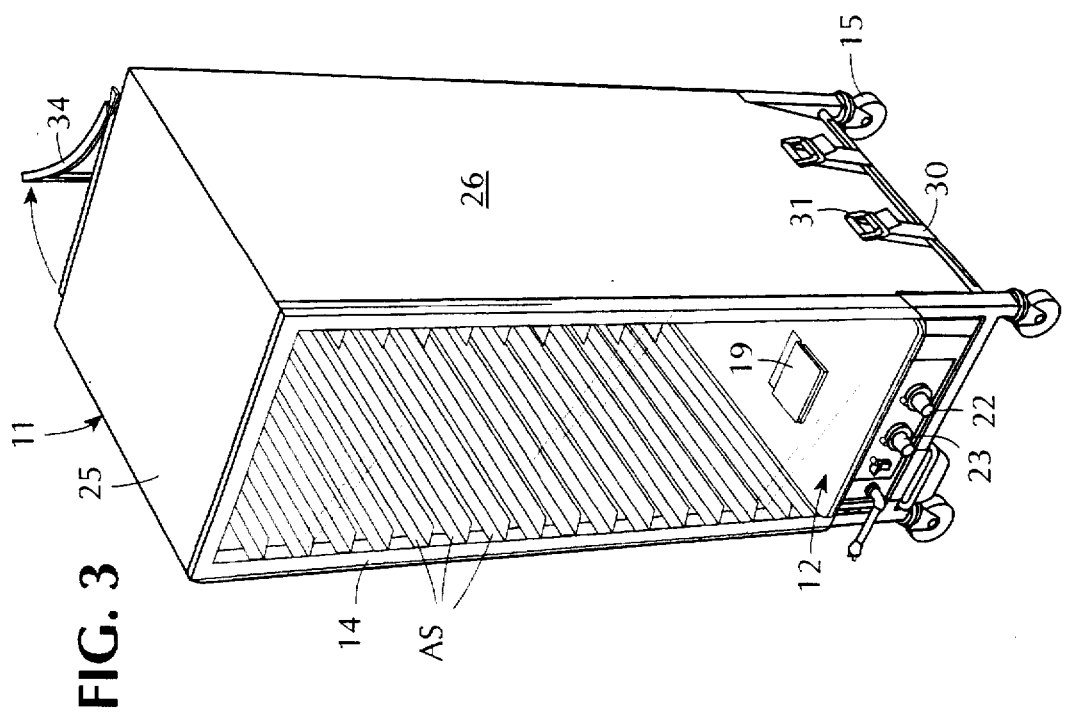
FIG. 3 is a perspective view of the rack covered by the proofing hood, as seen looking into the front end of the to rack through the transparent hood.

Attached to the bottom ends of side panels 26 and 27 of the hood is a pair of straps 30, each having a buckle 31. As shown in FIGS. 3 and 4, side panels 26 and 27 can be strapped to the lower rungs of the rack frame to secure the hood to the rack. In order to remove the hood from the rack, one has only to unstrap the side panels of the hood.

Rear panel 29 of the hood has an opening 32 therein adjacent its lower end to receive outlet 20 of the module. Punched in rear panel 29 is an array of small ports P which admit hot, humid air emitted from outlet 20 into the proofing chamber to proof dough pieces loaded on the baker's rack within this chamber. Ports P are so arranged to yield a uniform air flow from the top to the bottom of the unit.

Overlying rear panel 29 is a plastic feed duct FD defined by a rectangular border 33 having a lid 34 hinged thereto. A zipper extending along the unhinged sides of the lid serves to close the feed duct FD which in FIGS. 3 and 4 is shown swung open to expose the interior of duct.

When feed duct FD is closed, then hot, humid air blown therein from outlet 20 of the module creates a positive pressure within the duct which distributes the hot air throughout the duct so as to pass with substantially equal pressure through all of ports P in the rear panel 29 of the hood into the proofing chamber occupied by the rack.

Figure 5:
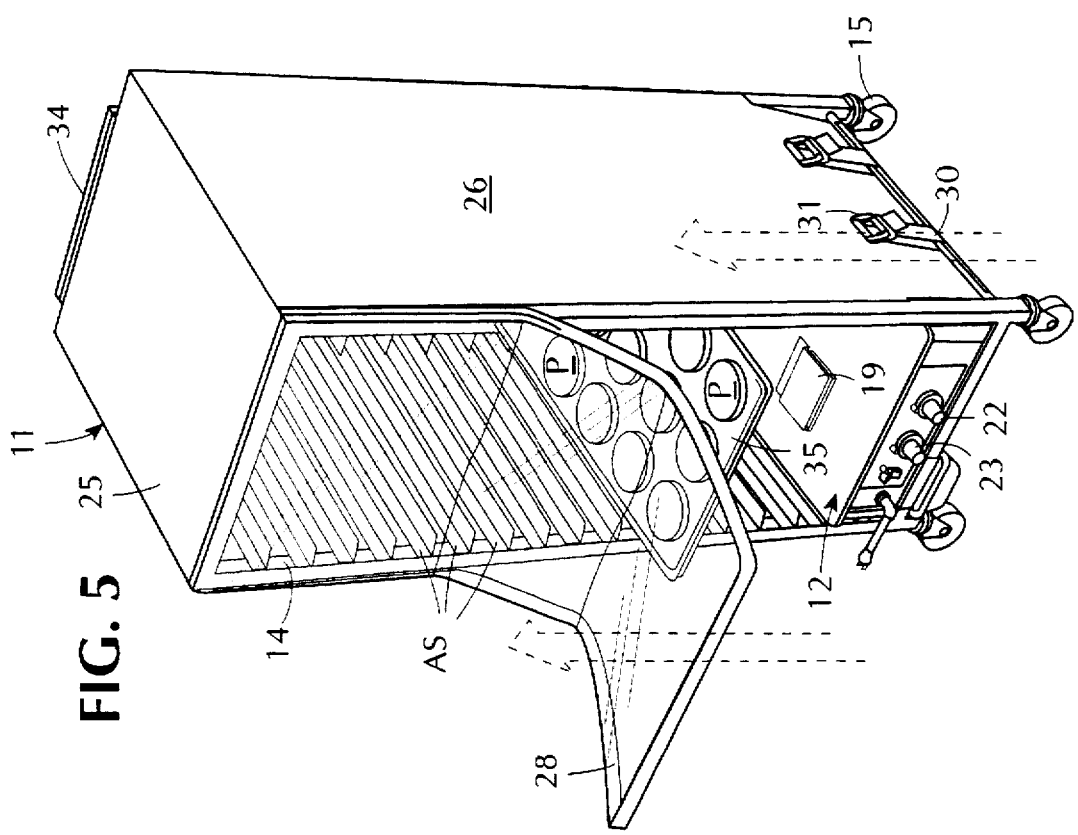
FIG. 5 is a perspective view of the rack covered by the proofing hood, as seen looking into the front end of the rack, the lower section of the transparent panel forming the return duct of the hood being zipped open so that one can remove pans carrying dough pieces from the lower section of the rack.

The transparent plastic panel 28 of the hood which covers the front end of the rack, as shown in FIG. 5, is provided with two sets of zippers which make it possible, to fold down this panel to expose only the upper half of the rack, or as shown in FIG. 5, to fold up this panel to expose only the lower half of the rack. Or the zipper may be fully opened to expose the entire rack.

The dough pieces D to be proofed are placed on flat metal pans 35 which slide onto slides 15 which define the multi-levels of the rack.

Figure 6:
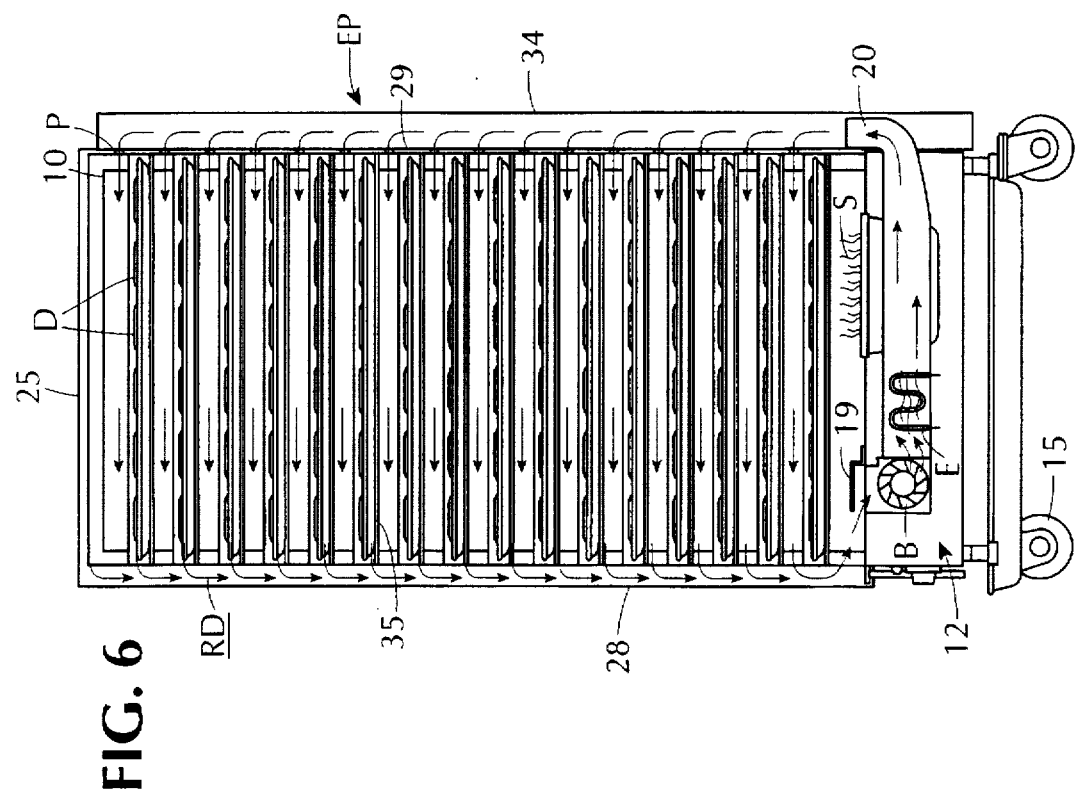
FIG. 6 is a section taken through the hood-covered rack loaded with dough pieces to be proofed, showing the circulating flow pattern of hot, humid air emanating from the outlet of the module at the base of the rack, the humid air being conducted by a feed duct covering the rear end of the rack to all levels of the rack where the air passes over the dough pieces and then flows back via the return duct covering the front end of the rack to the inlet of the module.

When front panel 28 is closed so that it is then parallel to the front end of rack 10 within the hood, the free space between the rack and front panel 28 defines a return duct RD, as shown in FIG. 6.

Operation of Assembly

It will be seen in FIG. 6 that all levels of the baker's rack 10 are occupied by pans 35 carrying shaped pieces D of yeast dough to be proofed, and that below the stack of pans at the base of the rack is module 12 which emits from its outlet 20 a stream of hot, humid air which is blown into feed duct FD.

Blower B within module 12 which sucks air into the module through inlet 19 and blows it through heater E and out through outlet 20 creates a positive pressure at the outlet and a negative pressure at the inlet. Hence steam S rising above the heated pan of water on top of the module is entrained by air sucked into inlet 19 and then blown out of outlet 20 into feed duct FD.

Feed duct FD is therefore under positive pressure thereby causing the hot, humid air therein to be uniformly distributed throughout rear panel 29 of the hood, the air being forced through the array of ports P in this panel into the proofing chamber occupied by the loaded rack.

As shown by the arrows in FIG. 6, hot, humid air from feed duct FD flows through ports P in rear panel 29 of the hood covering the rack so as to pass across the dough pieces D on every level in the rack, the volume of hot, humid air being substantially the same at each level.

The flow of hot, humid air follows a path across the dough pieces at each level in the rack passing into return duct RD at the front end of the rack. Because return duct RD communicates with inlet 19 of module 12, it is under negative pressure. As a consequence, the hot, humid air, after having subjected the dough pieces to a proofing environment, is then sucked back into the module where it is processed to produce a hot humid air stream that is recirculated in the proofing chamber.

Thus module 12 combined with multilevel rack 10 and hood 11 covering the rack acts to develop within the proofing chamber a circulating flow loop in which hot, humid air continuously flows concurrently through all levels of the rack to uniformly proof the dough pieces supported on each of these levels. Hence all pieces are proofed to the same degree, no piece being overproofed or underproofed.

When the proofing operation is completed, the hood and the module can then be removed from the rack, and the rack carrying the proofed dough pieces is ready for baking.

Because the soft proofing hood is formed of synthetic plastic sheeting, it is a simple matter to clean and sanitize the hood, so that it can be repeatedly used under acceptable sanitary conditions. However, the soft hood can be manufactured of light weight, inexpensive plastic sheeting, such as TYVEC or MYLAR so that the hood is then disposable and need not be cleaned.

Modifications

In the proofing assembly shown in FIGS. 1 to 6, module 12 is designed to fit into the base of rack 10. Alternatively, the module may be designed to fit onto the top of the rack to provide easier access to its controls. In this arrangement, the outlet of the module must be oriented to blow hot, humid air down feed duct FD, the module inlet then pulling in return air sucked up return duct RD, for recirculation in the loaded rack.

Our use may be made of a module external to the rack, in which case the module inlet and outlet must be coupled by pipes to the return and feed ducts in the proofing hood.

In the arrangement illustrated in the figures, feed duct FD is parallel to the rear end of rack 10, while return duct RD is parallel to the front end of the rack. In practice, the hood arrangement may be such as to place these ducts parallel to opposite sides of the rack which can then be loaded and unloaded form opposite ends of the rack.

Also in practice, instead of a soft hood formed of flexible plastic material, the hood may be molded of relatively rigid plastic material in which case the hood must be placed over the rack.

The hood disclosed herein is adapted to create about a rack loaded with dough pieces, a temporary cabinet in which the dough pieces are subjected to hot, moist air which serves to raise these pieces preparatory to their being baked. But the proofing hood is also useable to create a temporary cabinet which subjects cooked food loading the rack to hot air whose temperature is in a range of 140° to 170° F. to maintain the food in a hot, palatable state for a prolonged period.

To this end, the module in the base of the rack or elsewhere on the rack, acts only to heat the air blown therethrough, the hot air being returned to the module so as to be recirculated. In some instances it may be desirable to introduce some degree of moisture in the air to prevent the cooked food from drying out. The degree of moisture which is entrained in the hot air is controllable in module 12.

Instead of maintaining cooked food in a hot condition by means of the hood, the hood may be used to create a temporary cabinet about the rack loaded with food in which chilled air is recirculated to maintain the food cold. To this end, the module in the rack is then a compact refrigeration unit which blows cold air out of the outlet of the module and sucks in cold air in its inlet for recirculation in the rack.

While there has been shown and described preferred embodiments of a hood and module assembly for processing food products, it will be appreciated that many changes and modifications may be made therein without, however, departing from the essential spirit thereof.

We claim:

1. A hood and module assembly adapted to convert a multi-level rectangular rack loaded with pieces of yeast dough into a proofing chamber in which the pieces are subjected to a hot, humid air environment, said assembly comprising:

A. a module placed in the rack having an air inlet adjacent one side of the rack and an outlet adjacent a side opposite said one side from which is emitted a stream of hot humid air; and B. a hood fabricated of plastic sheeting enclosing the rack to form a proofing chamber having a feed duct parallel to said opposite side of the rack communicating with said outlet, and a return duct parallel to said one side of the rack communicating with said inlet, whereby hot, humid air from the outlet flowing into the feed duct is distributed thereby to pass across the dough pieces loaded in the multi-level rack and from there into the return duct to flow back into the inlet of the module for recirculation in the chamber to proof the dough pieces loading the rack.

2. An assembly as set forth in claim 1, in which the hood is made of flexible plastic material.

3. An assembly as set forth in claim 1, in which said one side is the rear end of the rack, and the opposite side of the front end of the rack.

4. An assembly as set forth in claim 1, in which the module has a casing within which is an electrically powered blower and heater which draws air through said inlet and blows humid air out of said outlet, said casing having on its top a heated water pan from which steam rises that is entrained by air drawn into the inlet whereby the air from the outlet is moist.

5. An assembly as set forth in claim 4, in which the blower in the module produces a positive pressure at the outlet, causing the feed duct to be under positive pressure and produces a negative pressure at the inlet, causing the return duct to be under negative pressure.

6. An assembly as set forth in claim 1, in which the levels of the rack are created by a vertical array of angle strips attached to opposing sides of an open frame to form slides on which are received flat pans carrying the dough pieces.

7. An assembly as set forth in claim 1, in which the hood is formed of synthetic plastic sheeting to define a top wall that rests on top of the rack, a pair of side panels depending from the top wall which lie against corresponding long sides of the rack, a front panel that depends from the top wall in parallel relation to the front short side of the rack to define the return duct, and a rear panel depending from the top wall covering the rear short side of the rack and having an array of ports therein to admit into the chamber hot, humid air from the duct.

8. An assembly as set forth in claim 7, in which the feed duct is attached to the rear panel of the hood.

9. An assembly as set forth in claim 8, in which the front panel is joined to the side panels by zippers which make it possible to fold out either an upper section of the front panel or a lower section thereof to gain access either to the upper section or the lower section of the rack.

10. An assembly as set forth in claim 1, in which the plastic sheeting is formed of polyvinyl chloride.

11. An assembly as set forth in claim 10, in which the plastic sheeting is transparent.

12. A hood and module assembly adapted to convert a rectangular open-rack loaded with food pieces into a temporary conditioning chamber in which the pieces are subjected to a conditioned air environment, said assembly comprising:

A. a module installable in the rack having an inlet adjacent one side of the rack and an outlet adjacent an opposite side thereof, said module being adapted to draw air into the inlet and to produce a conditioned air which is blown out of the outlet; and B. a hood fabricated of plastic sheeting enclosing the rack to form a temporary conditioning chamber having a return duct parallel to the one side of the rack and a feed duct parallel to the opposite side thereof, whereby conditioned air blown from the outlet flowing into the feed duct is distributed thereby to pass across the food pieces in the rack and from there into the return duct to flow back into the inlet of the module for recirculation in the chamber to condition the food pieces loading the rack.

13. An assembly as set forth in claim 12, in which the food pieces are yeast dough and the conditioned air produced in the module is hot humid air which serves to proof these pieces.

14. An assembly as set forth in claim 12, in which the food pieces are cooked food and the conditioned air produced in the module is hot air which serves to keep the pieces at an elevated temperature.

15. An assembly as set forth in claim 12, in which the food pieces are pieces that must be served cold, and the conditioned air produced in the module is refrigerated air.

* * * * *